United States Patent
Heath et al.

(10) Patent No.: US 9,611,874 B2
(45) Date of Patent: *Apr. 4, 2017

(54) SWAY BRACE ATTACHMENT

(71) Applicant: Cooper B-Line, Inc., Houston, TX (US)

(72) Inventors: Richard W. Heath, Yorba Linda, CA (US); Dallas Martin Dworak, Jr., San Bernardino, CA (US)

(73) Assignee: Cooper B-Line, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,171

(22) Filed: Jan. 8, 2016

(65) Prior Publication Data

US 2016/0123358 A1 May 5, 2016

Related U.S. Application Data

(63) Continuation of application No. 14/028,475, filed on Sep. 16, 2013, now Pat. No. 9,239,067, which is a (Continued)

(51) Int. Cl.
| | |
|---|---|
| *F16L 3/08* | (2006.01) |
| *F16B 2/06* | (2006.01) |
| *F16B 35/00* | (2006.01) |
| *F16L 3/20* | (2006.01) |
| *F16L 3/24* | (2006.01) |

(52) U.S. Cl.
CPC .............. *F16B 2/065* (2013.01); *F16B 2/06* (2013.01); *F16B 35/005* (2013.01); *F16L 3/20* (2013.01); *F16L 3/24* (2013.01); *Y10T 24/31* (2015.01); *Y10T 29/49947* (2015.01); *Y10T 29/49963* (2015.01); *Y10T 403/7041* (2015.01); *Y10T 403/7062* (2015.01); *Y10T 403/7064* (2015.01)

(58) Field of Classification Search
CPC combination set(s) only.
See application file for complete search history.

(56) References Cited

U.S. PATENT DOCUMENTS

| | | |
|---|---|---|
| 2,936,991 A | 5/1960 | Picha |
| 3,292,888 A | 12/1966 | Fischer |
| | (Continued) | |

OTHER PUBLICATIONS

ANVIL International, Seismic Sway Brace for Fire Protection, Apr. 2011, pp. 2, 5, 9, 11-14, 16.

*Primary Examiner* — Monica Millner
(74) *Attorney, Agent, or Firm* — Senniger Powers LLP

(57) ABSTRACT

A sway brace attachment for firmly connecting to a beam and other flanged structures, and a method for manufacturing the sway brace attachment. The sway brace attachment includes a main body and an insert that is captured within the main body by a pair of set screws which also engage the flange. Preferably, a third set screw is supported by the main body and engages the opposite side of the flange from the pair of set screws. The main body can be generally rectangular in shape, with a top wall, a pair of side walls extending from the top wall and a pair of bottom walls, which extend inwardly from respective side walls in an overlapping relationship. The sway brace attachment can be used for bracing pipes and other loads, suspended below ceilings and floors, against sway and seismic disturbances.

12 Claims, 3 Drawing Sheets

Related U.S. Application Data continuation of application No. 13/149,779, filed on May 31, 2011, now Pat. No. 8,534,625.

(56) References Cited

U.S. PATENT DOCUMENTS

| | | | | |
|---|---|---|---|---|
| 3,341,909 A * | 9/1967 | Havener | ................ | B25B 5/101 |
| | | | | 24/350 |
| 3,572,623 A | 3/1971 | Lapp | | |
| 4,036,546 A * | 7/1977 | Thompson | ............. | H01R 4/304 |
| | | | | 174/78 |
| 4,305,557 A * | 12/1981 | Kowalski | ................ | E21F 17/02 |
| | | | | 248/327 |
| 4,406,047 A * | 9/1983 | Jeffers | ................ | B25B 5/10 |
| | | | | 29/426.5 |
| 4,461,440 A * | 7/1984 | Heath | ................ | F16L 3/133 |
| | | | | 248/59 |
| 5,009,386 A | 4/1991 | Berger et al. | | |
| 5,082,216 A | 1/1992 | Roth | | |
| 5,564,659 A | 10/1996 | DeCapo | | |
| 5,595,366 A | 1/1997 | Cusimano et al. | | |
| 5,667,181 A | 9/1997 | van Leeuwen et al. | | |
| 5,832,679 A | 11/1998 | Roth | | |
| 6,050,766 A * | 4/2000 | Kies | .................... | F16B 37/0892 |
| | | | | 411/433 |
| 6,098,942 A * | 8/2000 | Heath | ................ | F16B 2/065 |
| | | | | 248/228.6 |
| 6,273,372 B1 * | 8/2001 | Heath | ................ | B25B 5/006 |
| | | | | 248/317 |
| 6,415,560 B1 * | 7/2002 | Rinderer | ................ | F16B 7/18 |
| | | | | 248/351 |
| 6,421,965 B2 | 7/2002 | Thompson et al. | | |
| 6,508,441 B1 | 1/2003 | Kirschner | | |
| RE38,075 E * | 4/2003 | Thompson | ................ | F16L 3/24 |
| | | | | 248/351 |
| 6,629,678 B1 | 10/2003 | Kirschner | | |
| 6,837,009 B1 | 1/2005 | Roth | | |
| 7,431,252 B2 * | 10/2008 | Birli | ................ | F16B 2/065 |
| | | | | 248/221.11 |
| 7,467,765 B2 | 12/2008 | Heath | | |
| 7,614,590 B2 * | 11/2009 | Boville | ................ | E04B 9/20 |
| | | | | 248/214 |
| 7,654,043 B2 * | 2/2010 | Heath | ................ | F16L 3/133 |
| | | | | 248/317 |
| 7,669,806 B2 | 3/2010 | Heath | | |
| 7,757,369 B2 | 7/2010 | Kassay et al. | | |
| 8,070,113 B1 | 12/2011 | Kirschner | | |
| 8,100,368 B2 | 1/2012 | Jackson et al. | | |
| 8,132,767 B2 | 3/2012 | Oh et al. | | |
| 8,152,650 B1 | 4/2012 | Brandt | | |
| 8,534,625 B2 * | 9/2013 | Heath | ................ | F16B 2/065 |
| | | | | 138/106 |
| 9,239,067 B2 | 1/2016 | Heath et al. | | |
| 2004/0031887 A1 * | 2/2004 | Heath | ................ | F16L 3/16 |
| | | | | 248/62 |
| 2004/0031896 A1 * | 2/2004 | Heath | ................ | F16B 2/06 |
| | | | | 248/317 |
| 2004/0195479 A1 | 10/2004 | Gulley | | |
| 2006/0214073 A1 * | 9/2006 | Mominee | ................ | F16B 2/065 |
| | | | | 248/226.11 |
| 2008/0173856 A1 | 7/2008 | Payne | | |
| 2008/0277536 A1 * | 11/2008 | Olle | ................ | F16B 2/065 |
| | | | | 248/72 |
| 2009/0183462 A1 | 7/2009 | Osborn et al. | | |
| 2009/0184222 A1 * | 7/2009 | Osborn | ................ | F16B 2/065 |
| | | | | 248/231.71 |
| 2010/0108840 A1 * | 5/2010 | Oh | ................ | F16B 2/065 |
| | | | | 248/229.1 |
| 2010/0299891 A1 * | 12/2010 | Myers | ................ | F16L 3/1211 |
| | | | | 24/457 |

\* cited by examiner

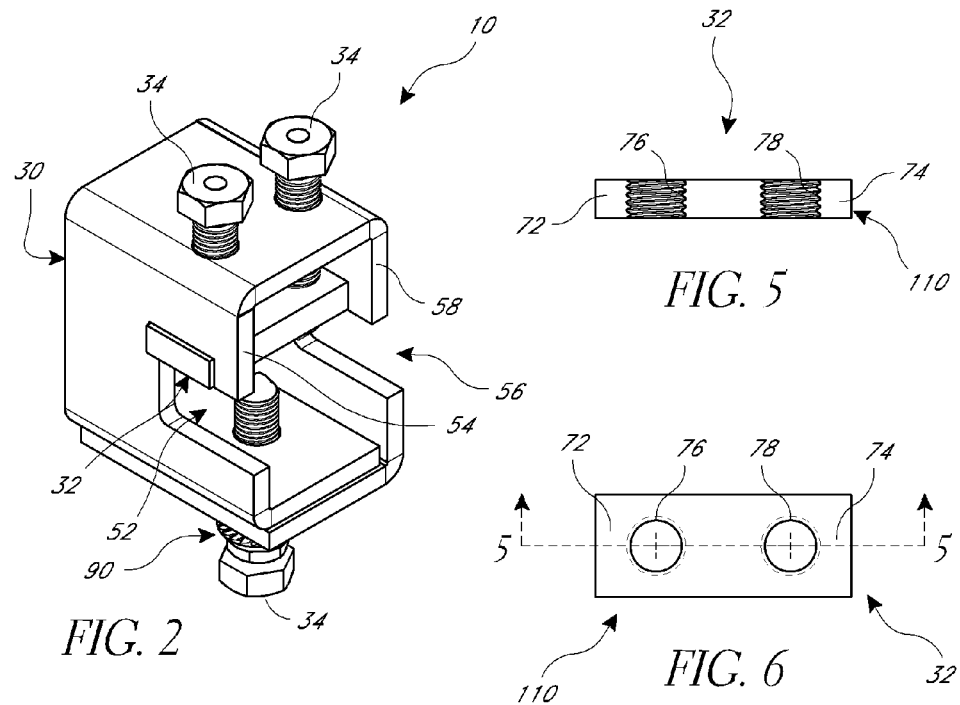
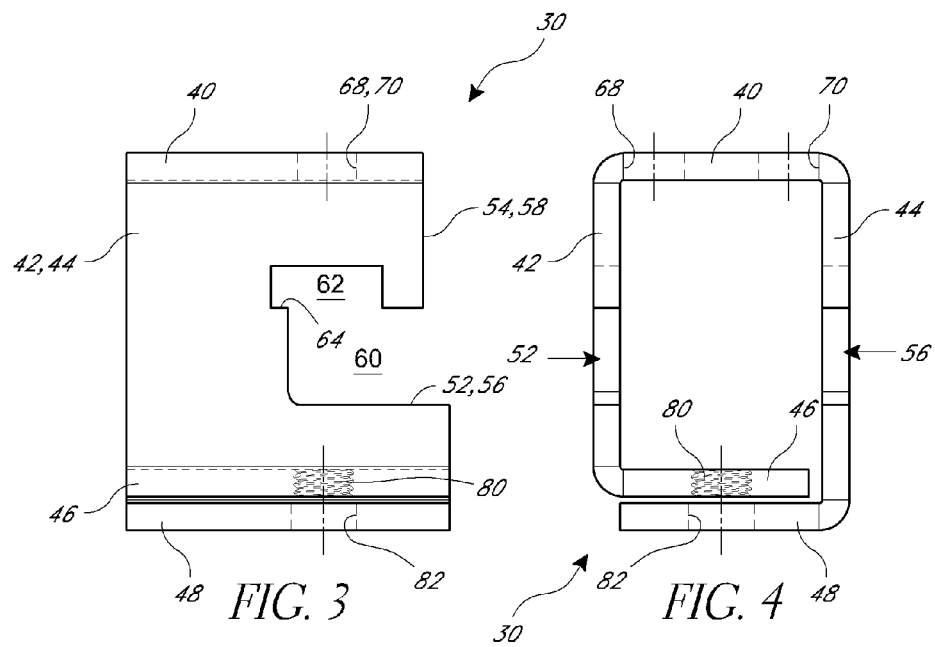

SWAY BRACE ATTACHMENT

PRIORITY DATA

This application is a continuation application and claims the benefit of U.S. patent application Ser. No. 14/028,475, filed Sep. 16, 2013, which is a continuation of U.S. patent application Ser. No. 13/149,779, filed May 31, 2011, each of which is incorporated by reference herein in its entirety.

BACKGROUND OF THE INVENTION

Field of the Invention

The present invention relates to devices for bracing pipes and other loads, suspended below floors and ceilings, against sway and seismic disturbances, and, in particular, to a sway brace attachment for firmly gripping a building support, such as a beam, and other flanged structures.

Description of the Related Art

There is a multitude of products in the market utilized by building and plumbing contractors for bracing and supporting pipes, ducts, sprinkler systems, fans, air-conditioners and other loads below floors and ceilings. These products include clamps, braces, hooks, straps, plates, brackets, among other items. Typically, one end of a brace is attached to the load while the other end is attached to a beam, or other support structure, on a floor or a ceiling. Due to the variety of possible beam types, sizes and orientations, as well as the variety of loads that need to be braced, the mechanism that attaches the brace to the beam should have a high load capacity and be capable of mounting on various types, sizes and locations of a flange.

Although such attachment mechanisms exist, including sway brace attachments sold by Tolco, a brand of Nibco, Inc., the assignee of the present application, a demand exists for sway brace attachments having equivalent or improved performance relative to existing attachments. Thus, there is a need for a sway brace attachment which can not only withstand substantial loads, but is also simply and expeditiously installable and adjustable, and is preferably economical to manufacture, thereby being desirably inexpensive in cost and in use.

SUMMARY OF THE INVENTION

A sway brace attachment constructed in accordance with one or more embodiments of the present invention incorporates a main body with an insert, or locking bar, and one or more set screws or other means for firmly connecting the sway brace attachment to a flange, such as that formed by beam, or other suitable structure. The sway brace attachment is part of a bracing system which is used to prevent swaying of pipes and other loads suspended below ceilings and floors. The sway brace attachment firmly grips a flange and is, typically, attached to one end of a brace while the other end of the brace is connected to the load.

Advantageously, the preferred sway brace attachments can not only withstand substantially heavy loads and is economical to manufacture, but it can also be used to support and/or suspend a wide variety of loads below ceilings and floors and further it can be attached to basically any flanged structure, for example, I-beams, H-beams, channels and plates among others, or any structure offering a relatively thin, flat surface for clamping.

An embodiment involves a sway brace attachment for clamping to a flange of a beam or other support structure. The sway brace attachment includes a body having a pair of spaced, generally parallel side walls, with each of the side walls having an elongated slot. Each of the slots has a closed end and an open end opening to one edge of a respective one of the side walls, with each of the slots opening in the same direction. Each of the slots has a first portion and a second portion. The first portions of the slots are configured to receive the flange. The body also includes a pair of overlapping walls, with one of the overlapping walls connected to one of the side walls and the other of the overlapping walls connected to the other of the side walls. The overlapping walls each having aligned holes passing therethrough, with at least one of the aligned holes being threaded. An insert extends between the side walls and is generally perpendicular thereto. The insert has one end extending through the second portion of the slot of one of the side walls and supported by the one side wall. The insert has an opposite end extending through the second portion of the slot of the other side wall and supported by the other side wall. The insert has at least one threaded hole and at least one first set screw extends through the at least one threaded hole of the insert to engage a first surface of the flange in the slots. A second set screw extends through the aligned holes of the overlapping walls to engage a second surface of the flange opposite the first surface. The at least one first set screw and the second set screw cooperate to connect the sway brace attachment to the flange.

In some arrangements, the at least one threaded hole of the insert can be a pair of spaced threaded holes, each adjacent a respective one of the side walls, and the at least one first set screw can be a pair of set screws respectively extending through the threaded holes of the insert to engage the flange.

In some arrangements, the body can also include a top wall extending between the side walls, with the top wall including at least one opening aligned with the at least one threaded hole and in which the at least one first set screw passes through the at least one opening of the top wall. The at least one threaded hole of the insert can be a pair of spaced threaded holes each adjacent a respective one of the side walls and the at least one opening of the top wall can be a pair of spaced openings aligned with a respective one of the spaced threaded holes, The at least one first set screw can be a pair of set screws respectively extending through the respective spaced openings and the respective threaded holes of the insert to engage the flange.

In some arrangements, the sway brace attachment includes a nut that is engagable with the second set screw for coupling the sway brace attachment to a load. The sway brace attachment can utilize set screws that each have a head configured to break off from a shaft portion when tightened to a threshold torque level. The closed end of each of the slots defined by the first portion can be offset from a portion of the closed end defined by the second portion to create a shoulder upon which the insert can rest. In some cases, the overlapping walls overlap a substantially entirely of one another.

An embodiment involves a sway brace attachment for clamping to a flange of a beam or other support structure and includes a body having a top wall, a first side wall extending from a first edge of the top wall, a second side wall extending from a second edge of the first wall opposite the first edge, the second side wall extending in the same direction as the first side wall, a first bottom wall extending from the first side wall and a second bottom wall extending from the second side wall. The first bottom wall and the second bottom wall overlap one another. The top wall has a pair of openings, the first bottom wall has a first opening and the second bottom wall has a second opening. The first opening is aligned with the second opening and at least one of the first and second openings is threaded. The first side wall and the second side wall include a first slot and a second slot, respectively, which are aligned with one another and configured to receive the flange. Each of the first and second slots has a closed end and an open end, wherein the open ends face in the same direction. An insert extends between, and is supported by, the first side wall and the second side wall. The insert has a first threaded hole and a second threaded hole, which are aligned with a respective one of the pair of openings in the top wall. A first set screw extends through one of the pair of openings in the top wall and is threaded into the first threaded hole of the insert. A second set screw extends through the other of the pair of openings in the top wall and is threaded into the second threaded hole of the insert. A third set screw extends through the respective first and second openings of the first and second bottom walls. The first, second and third set screws are configured to contact the flange to secure the sway brace attachment to the flange.

In some arrangements, the first slot and the second slot each has a first portion and a second portion. The flange is received within the respective first portions of the first and second slots and the insert is received within the respective second portions of the first and second slots. In each of the first and second slots, a portion of the closed end defined by the first portion can be offset from a portion of the closed end defined by the second portion to create a shoulder upon which the insert can rest. In some cases, a substantial entirety of the first bottom wall and the second bottom wall overlap one another. A nut can be provided that is engagable with the third set screw for coupling the sway brace attachment to a load. One or more of the first set screw, second set screw and the third set screw can have a head configured to break off from a shaft portion when tightened to a threshold torque level. The pair of openings of the top wall can be spaced in a lateral direction from one another such that one opening is adjacent the first side wall and the other opening is adjacent the second side wall. The first, second and third set screws can be aligned with one another in a longitudinal direction of the sway brace attachment.

An embodiment involves a method of assembling a sway brace attachment to a flange, including sliding at least a pair of aligned slots formed by a main body of the sway brace attachment onto the flange. A first set screw and a second set screw are threaded through a respective one of a pair of threaded holes disposed in an insert of the sway brace attachment until ends of the set screws engage a first side of the flange. A third set screw is threaded through a threaded hole disposed in the main body until an end of the third set screw engages a second side of the flange opposite the first side.

In some methods, the third set screw is passed through a pair of overlapping walls of the main body, and at least one of the overlapping walls defines the threaded hole of the main body. In some methods, the first, second and third set screws are tightened until a head portion of each set screw breaks off from a shaft portion of each set screw. In some methods, a nut is removed from the shaft portion of the third set screw after the head is broken off from the shaft, a sway brace is positioned onto the shaft portion of the third set screw and the nut is replaced onto the third set screw to couple the sway brace to the sway brace attachment.

An embodiment also involves a method of making a main body of a sway brace attachment including stamping a flat, generally rectangular work piece, bending side walls relative to a top wall and bending first and second bottom walls relative to the side walls such that the bottom walls overlap one another. The stamping preferably includes creating slots in the side walls configured to receive a flange, at least one hole (preferably, two spaced holes) in the top wall and aligned holes in the bottom walls. The creation of the slots can also include creating portions to receive an insert. The portions created to receive the insert can be offset from the remaining portion(s) of the slots to create a shoulder, which can support the insert. One of the aligned holes in the bottom walls can be threaded. An embodiment also includes pre-assembling the sway brace attachment by inserting the insert into the slots, passing a set screw(s) into each of the at least one hole and threading the set screw(s) into corresponding threaded holes of the insert to couple the insert to the main body. Another set screw can have a nut screwed onto it and can then be threaded into the aligned holes.

For purposes of summarizing the invention and the advantages achieved over the prior art, certain objects and advantages of the invention have been described herein above. Of course, it is to be understood that not necessarily all such objects and advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects and advantages of the present invention are described herein with reference to drawings of a preferred embodiment, which is provided for the purpose of illustration, and not limitation. The drawings contain eight (8) figures.

FIG. 2 is a perspective view of the sway brace attachment of FIG. 1 separate from the bracing system, which includes a main body, an insert and a plurality of set screws.

FIG. 3 is a side view of the sway brace attachment of FIG. 1.

FIG. 4 is a front view of the sway brace attachment of FIG. 1.

FIG. 5 is a cross-sectional view of the insert of the sway brace attachment of FIG. 1 separate from the sway brace attachment and taken along the line 5-5 of FIG. 6.

FIG. 6 is a top view of the insert of FIG. 5.

DETAILED DESCRIPTION OF THE PREFERRED EMBODIMENTS

Figure 1:
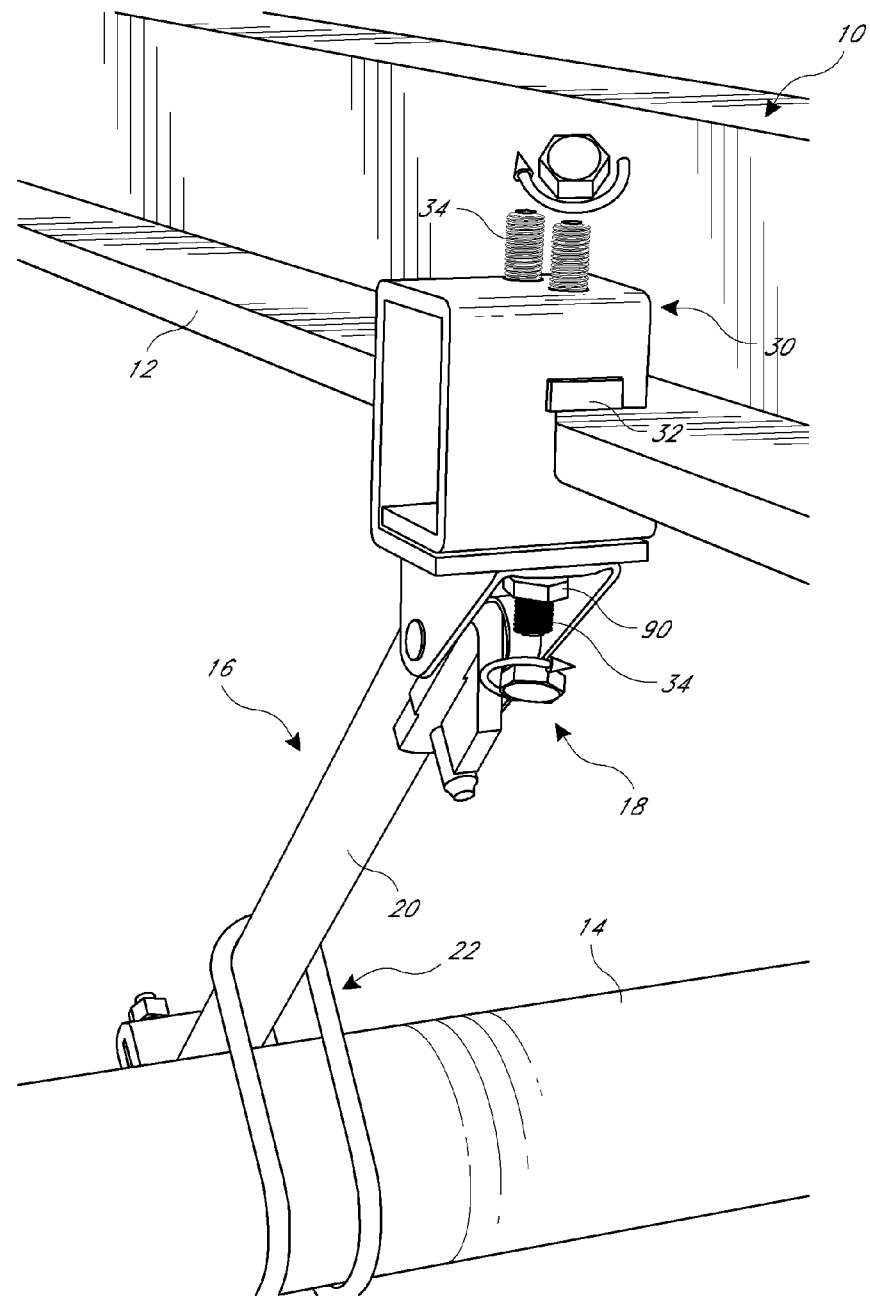
FIG. 1 is a perspective view of a bracing system attached to a beam and utilized to brace a load, such as a pipe. The bracing system incorporates a sway brace attachment having certain features, aspects and advantages of the present invention. The sway brace attachment couples a sway brace assembly to the beam.

FIGS. 1-7 show a sway brace attachment 10, and various component portions of the attachment 10, constructed and assembled in accordance with certain features, aspects and advantages of an embodiment of the invention. FIG. 1 illustrates the sway brace attachment 10 attached to a structural or support member 12 and utilized to support a supported member 14. The illustrated support member 12 is an I-beam; however, the sway brace attachment 10 can be utilized with other types of beams, flanged members and other support members including, for example, wide flange beams, open web and welded truss beams, C-channel, metal trusses, structural steel and the like. The illustrated supported member 14 is a pipe that is generally perpendicular with respect to the beam 12. The supported member 14 can also be a pipe that is generally parallel to the beam 12 or that runs at an oblique angle relative to the beam 12. That is, the sway brace attachment 10 can be a lateral or longitudinal sway brace. Moreover, the supported member 14 can be any kind of pipe, ducting, electrical conduit or any other member for which bracing is desired.

The sway brace attachment 10 can be coupled to the supported member 14 through one or more intermediate structures, such as a sway brace or sway brace assembly 16. In the illustrated arrangement, a modular system is used in which a transitional element 18 is coupled to the sway brace attachment 10 and a bracing pipe 20 is coupled to the transitional element 18. However, in other arrangements, the sway brace can be a single structure, which may be rigid or adjustable. The supported member 14 is coupled to the bracing pipe 20 through a hanger attachment or "bracedpipe" attachment 22, such as a pipe hanger. The pipe hanger or hanger attachment 22 can be of any suitable construction depending on the object to be supported. The pipe or other supported member 14 which is supported by the bracing pipe 20 can be referred to as the "braced pipe" or "braced member."

The illustrated sway brace attachment 10 comprises a main body 30, an insert 32 and one or more threaded fasteners 34. In the illustrated arrangement, the main body 30, the insert 32 and the threaded fasteners 34 are all separate components from one another. However, other configurations also are possible. The insert 32 cooperates with the main body 30 to support one or more of the threaded fasteners 34. In particular, preferably, the insert 32 receives two of the threaded fasteners 34 and transfers a load from the fasteners 34 to the main body 30. Preferably, a third fastener 34 is received by the main body 30. The fasteners 34 secure the main body 30 to the beam or other support member 12 thereby preferably providing a multiple point (e.g., a three point) mechanical connection between the sway brace attachment 10 and the beam. The upper and lower fasteners 34 can be aligned with one another in longitudinal and/or lateral directions of the sway brace attachment 10, or the fasteners 34 can be offset from one another. For example, the upper fasteners 34 can be offset from the lower fastener(s) 34 in the longitudinal and/or lateral direction. However, preferably, the upper and lower fasteners 34 are aligned in the longitudinal direction and offset in the lateral direction, with a single lower fastener 34 positioned between the pair of upper fasteners 34.

With additional reference to FIGS. 2-4, the main body 30 generally comprises a top wall 40. The main body 30 also comprises a first side wall 42 and a second side wall 44. The first side wall 42 extends downward from the top wall 40 and the second side wall 44 extends downward from the top wall 40. The first and second side walls 42, 44 can be mirror images of one another. A first bottom wall 46 extends inwardly from a lower portion of the first side wall 42 and a second bottom wall 48 also extends inwardly from a lower portion of the second side wall 44. The illustrated main body 30 is hollow and generally rectangular in cross-sectional shape. Preferably, the first bottom wall 46 and second bottom wall 48 overlap one another along a substantial portion thereof. In the illustrated arrangement, the first bottom wall 46 and second bottom wall 48 overlap one another over a substantial entirety of their length, that is, in the width direction of the sway brace attachment 10.

The terms "top," "bottom," "side" and the like are merely used to provide a frame of reference for this written description. The structures described herein can be mounted in any particular orientation and, therefore, the usage of these terms should not be considered limiting in any manner. Other relative or directional terms may be used herein. These terms are used in the context of the particular orientation(s) shown and should not be considered as limiting the structures to the illustrated orientation in actual use.

Figure 8:
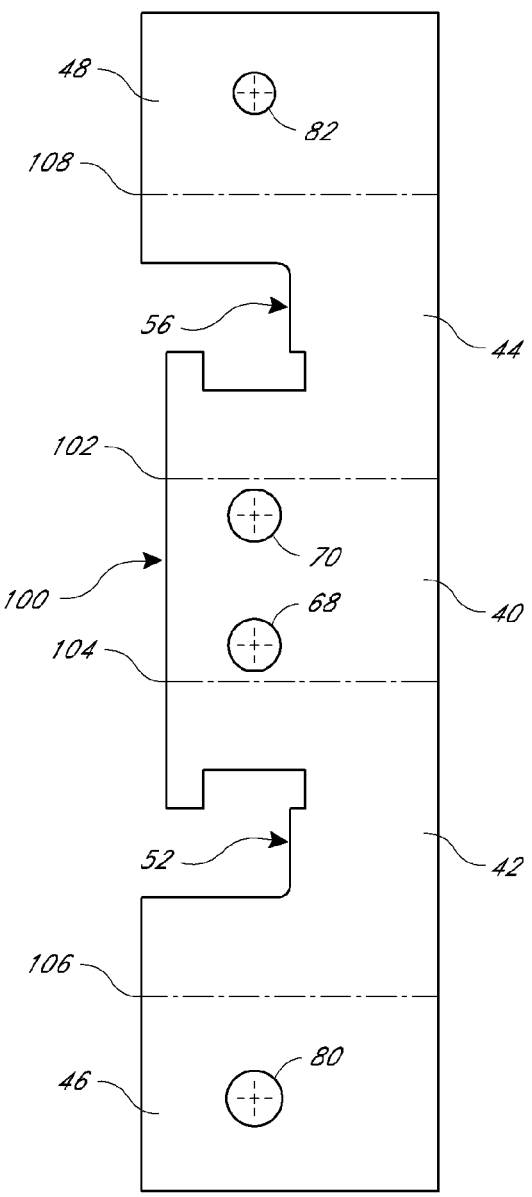
FIG. 8 is a plan view of a work piece that can be bent to create the main body of the sway brace attachment of FIG. 1.

Preferably, the main body 30 is formed from a single plate 50 of material (FIG. 8). In other words, the main body 30 preferably is formed as a monolith or single structure and each of the walls 40, 42, 44, 46, 48 is integrally related. Stated yet another way, each of the adjoining walls (e.g., the top wall 40 and the first side wall 42) is connected at a bend. Other configurations are possible; however, the integrated construction advantageously reduces time and complication during manufacture.

The first side wall 42 has an elongated first slot 52 extending through an edge 54 of the first side wall 42. Similarly, the second side wall 44 has an elongated second slot 56 extending through an edge 58 of the second side wall 44. The slots 52 and 56 preferably are aligned in a vertical direction and open in the same direction such that the main body 30 defines a jaw-like shape with a mouth configured to receive a flange of a beam or a portion of a support member 12, for example, as shown in FIG. 1. Preferably, the slots 52 and 56 generally define an L-shape or J-shape when viewed from the side. A first, preferably rectangular, portion 60 of each of the slots 52 and 56 is configured to receive the flange of the beam or a portion of another support member 12. Preferably, the first rectangular portion 60 has a height that is equivalent or substantially equivalent to the height of the opening in the respective edge 54, 58. The mouth or jaw is sized and shaped to fit relatively thick flanges, which improves the versatility of the attachment 10.

The side walls 42 and 44 each define a second, preferably rectangular, portion 62 of each respective slot 52 and 56 that is above, and preferably adjacent, the first portion 60. That is, preferably, the second portion 62 opens into the first portion 60 of each slot 52 and 56. Preferably, a rearward end of the second portion 62 is spaced in a rearward direction from a rearward end of the first portion 60. Thus, a support surface or shoulder 64 is defined at a juncture between the first portion 60 and second portion 62 of each slot 52 and 56. Preferably, the second portions 62 of each slot 52 and 56 are aligned and sized to receive the insert 32. Thus, preferably, a portion of the insert 32 can rest on the shoulder 64 when assembled. Although it is preferred that the first portion 60 and second portion 62 are formed as portions of a single slot 52 or 56 for efficiency in manufacturing and assembly of the sway brace attachment 10, other arrangements are also possible in which the first portion 60 and second portion 62 are each formed by separate slots or openings.

The top wall 40 has a pair of holes 68, 70 which are preferably aligned with one another and aligned with the second portion 62 of each slot 52 and 56 in a forward-rearward direction. In particular, preferably, the holes 68, 70 are substantially aligned with a center line of the second portion 62 of the slots 52, 56. The holes 68, 70 are sized to accommodate the fasteners 34 and, preferably, are somewhat, but not substantially, larger than the outer diameter of the shaft portion of the fasteners 34. Thus, the holes 68, 70 limit radial movement of the fasteners 34. Preferably, the holes 68, 70 are defined by relatively smooth walls. That is, preferably, the holes 68, 70 are not threaded.

The insert 32, which can be referred to as a locking bar, (see FIGS. 5 and 6) preferably is generally elongated and rectangular with a first end 72 positioned in the second portion 62 of the slot 52, and a second end 74 positioned in the second portion 62 of the slot 56. The ends 72, 74 have a generally rectangular perimeter. The insert 32 is in a generally perpendicular relation to the side walls 42, 44 and partially rests on the shoulder 64. The insert 32 has one or more threaded holes to accommodate the threaded fasteners 34. Preferably, the insert 32 has a pair of threaded holes 76 and 78 adjacent to the side walls 42 and 44, respectively, and are aligned with the holes 68 and 70, respectively, when the insert 32 is positioned in the main body 30. Thus, the threaded fasteners 34 preferably pass through a respective one of the holes 68, 70 and threadably engage a respective one of the threaded holes 76, 78. With the insert 32 partially resting on the shoulder 64, the threaded fasteners 34 engaging the insert 32 and the holes 68, 70 of the main body 30 inhibiting substantial movement of the threaded fasteners 34, the insert 32 preferably is held in place within the second portions 62 of the slots 52, 56. That is, the interaction between the threaded fasteners 34 and the holes 68, 70 restricts a forward end of the insert 32 from rotating in a downward direction, thereby inhibiting removal of the insert 32 from the second portions 62 of the slots 52, 56. Conveniently, the insert 32 is held in place even with the threaded fasteners 34 backed off to ease assembly of the sway brace attachment 10 to a support member, as described further herein.

Preferably, the first bottom wall 46 has a first opening 80 and the second bottom wall 48 has a second opening 82 that are aligned with one another. In the illustrated arrangement, the first opening 80 and the second opening 82 are also aligned in a forward-rearward direction with the openings 68, 70 of the top wall 40. Preferably, the openings 80, 82 are centered or substantially centered in a width direction of the main body 30. The first opening 80 and the second opening 82 are configured to accommodate a threaded fastener 34. Preferably, one of the first opening 80 and the second opening 82 is threaded and the other of the first opening 80 and the second opening 82 is not threaded. In the illustrated arrangement, the first opening 80 of the first bottom wall 46 (i.e., the relative upper one of the bottom walls 46, 48) is threaded and the second opening 82 of the second bottom wall 48 (i.e., the relative lower one of the bottom walls 46, 48) is not threaded or is unthreaded. However, in other arrangements, this order could be reversed or both openings 80, 82 could be threaded. The presence of the threaded fastener 34 within the openings 80, 82 inhibits or prevents significant relative movement between the first bottom wall 46 and the second bottom wall 48. In particular, lateral movement of the bottom walls 46, 48 is inhibited or substantially prevented to inhibit or substantially prevent spreading of the bottom walls 46, 48 and side walls 42, 44 of the main body 30, thereby maintaining the strength of the sway brace attachment 10. Thus, preferably, the unthreaded opening 80 or 82 (if any) is sized relatively closely to the outside diameter of the shaft portion of the fastener 34. Although the fastener 34 may be provided as a means of coupling the bottom walls 46, 48 to inhibit or at least substantially prevent spreading of the bottom walls 46, 48, other suitable mechanisms can also be used for this purpose, including fasteners (e.g., rivets, screws) that do not contact the flange, clamps, welding, interference structures and other suitable arrangements for fixing the bottom walls 46, 48 relative to one another.

In the illustrated arrangement, the lower threaded fastener 34 (i.e., the threaded fastener passing through the lower walls 46, 48) includes a nut 90 (FIGS. 1 and 2) threadably engaging a threaded shaft portion of the fastener 34. The nut 90 can be used to secure a sway brace assembly 16 (FIG. 1) to the sway brace attachment 10, as described further herein.

Preferably, the main body 30 and the insert, or locking bar, 32 are fabricated from hot-rolled, low-carbon steel to meet the standards set by the Underwriters Laboratories (U.L.), Factory Mutual Engineering (F.M.), or other such quality control groups, though other suitable materials may also be used. Additionally, the main body 30 and the insert 32 may have a plain or electro-galvanized finish.

Figure 7:
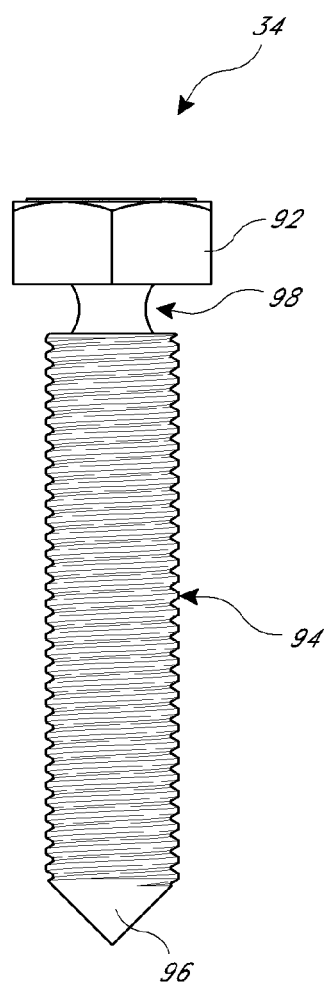
FIG. 7 is a side view of the set screw of the sway brace attachment of FIG. 1 separate from the sway brace attachment.

With reference to FIG. 7, an embodiment of a threaded fastener 34 is shown. The threaded fasteners 34 may also be referred to herein as set screws. Preferably, each threaded fastener 34 has a head portion 92 and a threaded portion 94. As described, two of the set screws 34 extend through the holes 68 and 70, respectively, and are threaded into the holes 76 and 78 of the insert 32, thereby capturing the insert 32 within the slots 52, 56. The set screws 34 are long enough to be threaded through the insert 32 to engage a flange, or other structure, positioned in the slots 52, 56. Another set screw 34 preferably extends through the holes 80 and 82 of the lower walls 46 and 48, respectively. This set screw 34 is long enough to engage the flange, or other structure, positioned in the slots 52, 56. Each of the set screws 34 has an end 96, which preferably is in the form of a relatively sharp cone point for engaging the flange, or other structure. The cone point 96 facilitates the set screws 34 in creating a deformation in the flange, or other structure, to increase the bite of the set screw 34 in the flange, or other structure, to inhibit or prevent sliding movement of the set screw 34. The cone point 96 does not necessarily need to possess a sharp point. A small flat surface at the end can be permissible. Preferably, any flat surface at the end 96 is less than about 0.05 inches, less than about 0.04 inches or less than about 0.031 inches. In other arrangements, the end 96 can be a cup point or other type of end structure, if needed or desired.

Preferably, the screw head 92 is adapted to break off at a particular torque level or particular torque range, which may be a threshold or predetermined torque level or range. This feature is a convenient method for ensuring that the set screw 34 has been properly torqued or tightened. As illustrated, a portion of the shaft of the set screw 34 includes a reduced cross-section portion 98. The reduced cross-section portion 98 can have a particular minimum diameter (or cross-sectional dimension for non-circular shapes) selected in view of the material properties, heat treatment and/or other relevant factors such that the screw head 92 will break off at a particular torque level, which may be a particular minimum value or a range of values.

In the illustrated embodiment, the main body 30 is about 0.25 inches thick. The overall peak dimensions of the main body 30 are about 3.5 inches high, 2.375 inches wide, and 3 inches long. The top wall 40 is preferably about 2.375 inches wide and spaces the inner surfaces of the side walls 42 and 44 by about 1.875 inches. The side walls 42 and 44 preferably have a peak height of about 3.5 inches. The first portions 60 of the slots 52 and 56 have dimensions of about 1.5 inches by about 0.9 inches (length by height). With such dimensions, the sway brace attachment 10 is capable of use with flanges between about ⅜ inch and ⅞ inch thickness. The second portions 62 of the slots 52 and 56 have dimensions of about 1.031 inches by about 0.39 inches (length by height). The rearward ends of the first portions 60 and second portions 62 are offset from one another such that the shoulder 64 has a length of about 0.156 inches. The top wall 40 and upper portions of the side walls 42, 44 above the slots 52, 56 have a length (in a forward-rearward direction) of about 2.75 inches. The bottom walls 46, 48 and lower portions of the side walls 42, 44 below the slots 52, 56 have lengths of about 3 inches. Thus, the upper portions of the edges 54, 58 of the side walls 42, 44 above the slots 52, 56 are offset in a rearward direction from the lower portions of the edges 54, 58 of the side walls 42, 44 below the slots 52, 56 by a distance of about 0.25 inches in a forward-rearward direction. The lengths of the first portions 60 of the slots 52, 56 are measured from the lower portions of the edges 54, 58. The upper bottom wall 46 has a width of about 1.841 inches and a length of about 3 inches. The lower bottom wall 48 has a width of about 1.966 inches and a length of about 3 inches. A vertical gap between the upper bottom wall 46 and the lower bottom wall 48 is about 0.063 inches. The holes 68, 70 have diameters of about 0.531 inches. The centers of the holes 68, 70 are spaced about 0.891 inches rearward of the forward edge of the top wall 40, about 1.313 inches from one another and about 0.531 inches from the side edges of the top wall 40. The centers of the holes 80 and 82 are spaced about 1.141 inches from the front edges of the bottom walls 46, 48 and substantially centered in the lateral direction of the walls 46, 48 and/or along the center line of the main body 30. The threaded hole 80 has a diameter of about 0.5 inches and the unthreaded hole 82 has a diameter of about 0.563 inches.

Preferably, the insert 32 (see FIGS. 2 and 3) is about 0.375 inches thick, about 1 inch wide (forward-rearward or length direction of the assembled sway brace attachment 10) and about 2.5 inches in length (lateral or width direction of the assembled sway brace attachment 10), which permits it to fit comfortably in the second portions 62 of the slots 52, 56 and slightly extend outwardly side walls 42, 44 when the insert 32 is placed in the main body 30. The spacing between the threaded holes 76 and 78 is preferably about 1.313 inches, which disposes them in substantial alignment with the holes 68 and 70, respectively. The threaded holes 76, 78 comprise standard ½-inch female threads.

Preferably, with reference to FIG. 7, the threaded portion 94 of each set screw 34 comprises standard ½-inch threads. The shaft portion of the set screw 34, including the threaded portion 94, end 96 and reduced cross-section portion 98 preferably is about 2.5 inches in length, so that the cone point 96 can extend into the area defined between the slots 52 and 56. The reduced cross-sectional portion 98 can have a length of about 0.188 inches. Preferably, the set screws 34 are fabricated from a hardened carbon steel, though other suitable materials may be used. Of course, those skilled in the art will recognize that these and other dimensions presented herein are illustrative of one preferred embodiment, and that the present invention may be alternatively dimensioned with efficacy, as required or desired.

The present invention also prescribes a method for attaching the clamp or sway brace attachment 10 to a flange or other support structure. The method preferably begins with sliding slots 52 and 56 of the sway brace attachment 10 over the flange, for example, the bottom flange of the beam 12, as shown in FIG. 1. The upper set screws 34 (i.e., the set screws that engage the insert 32) are inserted through respective holes 68 and 70 in the main body 30 and threaded into holes 76 and 78 in the insert 32 until the cone points 96 of the set screws 34 make contact with the flange. The set screws 34 are tightened preferably until their heads 92 break off, whereby the set screws 34 securely contact the flange. Preferably after the upper set screws 34 are properly tightened, the lower set screw 34 (i.e., the set screw that engages the main body 30) is tightened against the flange preferably until its head 92 breaks off. This procedure results in the sway brace attachment 10 being firmly attached to the flange 60. As described, the provision of upper and lower set screws 34 increases the bite of the sway brace attachment 10 on the flange to increase resistance to overturning (rotation) of the sway brace attachment 10.

Thus, it can be seen that the set screws 34 comprise means extending between the insert 32 and the flange that connect the sway brace attachment 10 to the flange. If desired, means other than set screws may be employed to provide the necessary function. For example, this means can comprise a suitable wedge, such as a spring-loaded and/or cammed member, operable via a lever or the like and extending between the insert 32 and the flange. The means reacts against the insert 32 and presses the flange against the portions of the side walls 42, 44 forming respective bottom edges of the respective slots 52, 56.

In use, once the sway brace attachment 10 has been attached to the beam 12, it may be used to support loads, for example, pipe 14. The beam 12 may either support a floor or a ceiling with the floor or ceiling resting on the top horizontal flanges of the beam 12. Preferably, the slots 26 and 28 are dimensioned to easily slip over the flange of common beam sizes, as well as other common or suitable support structures.

The sway brace attachment 10 is capable of supporting substantially large loads. In one embodiment, the maximum load rating is at least about 2000 pounds and, in particular, 2015 pounds. This is, in part, due to the availability of the slot portions 62 in which the insert 32 resides and the slot portions 60 in which the flange resides. In this manner, the load is not only distributed over the main body 30, but the insert 32 is also supported at two locations by the side walls 42, 44 of the main body 30, which resists bending and buckling of the insert 32. Advantageously, the placement of the set screws 34 ensures that the regions of high stress concentrations on the insert 32 are adjacent to support provided by the side walls 42, 44 of the main body 30. Moreover, the provision of two bottom walls 46, 48 and a set screw 34 passing through the bottom walls 46, 48 inhibits or at least substantially prevents spreading of the bottom walls 46, 48 (and, thus, the side walls 42, 44) to create an effective closed or box-shaped main body 30, which provides improved strength relative to U-shaped bodies or other open structures. Additionally, the particular materials and dimensions used in the construction of the sway brace attachment 10 further add to its ability to support substantially heavy loads.

The sway brace attachment 10 of FIG. 1 illustrates one preferred way of supporting a pipe 14 that is oriented substantially perpendicular to the beam 12. As described previously herein, a transitional element 18 is attached to the sway brace attachment 10. In particular, after the sway brace attachment 10 is attached to the beam 12 and the head 92 of the lower set screw 34 has been broken off, the nut 90 can be removed from the threaded portion 94 of the set screw 34. Then, the transitional element 18 (or other sway brace assembly 16) can be secured to the sway brace attachment 10 by passing the set screw 34 through an aperture of the transitional element 18 and replacing and tightening the nut 90. The fitting or transitional element 18 is coupled to one end of a bracing pipe 20, which has its other end connected to the pipe 14 (or other supported or braced member) by means of a clamping device or pipe hanger 22. The illustrated sway brace attachment 10 is configured for use with 900 series sway brace assemblies and components sold by Tolco®, but in some arrangements may also be suitable for use with other Tolco® assemblies and components, among other possible products. Those skilled in the art will readily recognize that suitable fittings other than the pipe hanger 22 and braces other than the bracing pipe 20 may also be employed in conjunction with the sway brace attachment 10. Of course, more than one sway brace attachment 10 can be used, at spaced locations along the beam 12 and/or on additional beams, to support the pipe 14 along its length. The number of clamps needed and, hence, their spacing is dependent on the size and weight of the pipe to be supported or braced. Moreover, the sway brace attachment 10 can also be used to support ducts, sprinkler systems, fans, air-conditioners and other loads which are mounted below floors and ceilings.

Though FIG. 1 illustrates the sway brace attachment 10 attached to a horizontal flange of a beam 12, those of ordinary skill in the art will readily recognize that the sway brace attachment 10 of the present invention can be mounted on a variety of structures. For example, the sway brace attachment 10 may be attached to I-beams, H-beams, channels, plates, other flanged structures and the like. This versatility, advantageously, further adds to the modular nature of the sway brace attachment 10.

The sway brace attachment 10 of the present invention may be manufactured by machining, casting or forging, but a preferred method of manufacturing the sway brace attachment 10 includes stamping flat strips of metal plate. Referring to FIG. 8, a strip of metal plate is stamped into a generally flat, rectangular shaped piece 100. In FIG. 8, what will become the interior or inward-facing surface of the sway brace attachment 10 is shown. The stamping includes punching a pair of elongated slots 52, 56 in respective side walls 42, 44 of the piece 100. The side walls 42, 44 are spaced by a top wall 40. The stamping further includes punching a pair of holes 68 and 70, which are situated near respective junctions (lines) 102, 104 between the top wall 40 and the respective side walls 52, 56. The piece 100 further includes a first bottom wall 46 and a second bottom wall 48, one of which is adjacent the side wall 42 and the other of which is adjacent the side wall 44. In the illustrated piece 100, the first bottom wall 46 is adjacent the side wall 42 to create a junction (line) 106 therebetween. Similarly, the second bottom wall 48 is adjacent the side wall 44 to create a junction (line) 108 therebetween. The stamping further includes punching a hole 80 in the first bottom wall 46 and punching a hole 82 in the second bottom wall 48. If desired, the junctions (lines) 102, 104, 106, 108 can be provided with a crease or indentation to facilitate bending of the piece 100. The side walls 42, 44 are bent, preferably approximately 90 degrees with respect to the top wall 40, along the lines marked 102 and 104, respectively. The bottom walls 46, 48 are also bent inwardly or toward one another, preferably approximately 90 degrees with respect to the respective side walls 42, 44, along the lines marked 106 and 108, respectively. Thus, a generally box-shaped sway brace attachment 10 is created. The opening 80 of the first bottom wall 46 can be threaded, before or after the bending of the walls.

With reference to FIGS. 5 and 6, a strip of metal plate is stamped into a generally rectangular bar 110. The bar 110 is sized and configured to fit within the second portions 62 of the slots 52, 56 of the respective side walls 42, 44. The stamping includes punching a pair of holes 76, 78 through the bar 110 which are spaced a distance approximately equal to the spacing between the holes 68 and 70 of the main body 30. The holes 76 and 78 are threaded, thereby creating the insert or locking bar 32.

In a preferred method of assembling the sway brace attachment 10, the insert 32 is inserted into the second portions 62 of the slots 52, 56 of the respective side walls 42, 44 so that the threaded holes 76, 78 of the insert 32 are aligned with the respective holes 68, 70 of the top wall 40 of the main body 30. Each one of a pair of set screws 34 are inserted through respective holes 68 and 70 of the main body 30 and threaded into respective threaded holes 76 and 78 of the insert 32, thereby capturing the insert 32 in the main body 30. A nut 90 is threaded onto another set screw 34 with the bottom of the nut 90 facing away from the head 92 of the screw 34. The combination of the set screw 34 and nut 90 is then threaded into the threaded hole 80 of the first bottom wall 46.

The above-described method is especially suited for automated assembly lines, wherein stamping, punching and bending operations can be efficiently executed. The simplicity and speed of this manufacturing method results in an end-product that is economical to manufacture and, thus, is desirably inexpensive. Of course, alternatively, and as mentioned before, the components of the sway brace attachment 10 may be machined or otherwise manufactured, but this process is more time consuming and, consequently, more expensive.

The utility and versatility of the present invention will be readily apparent to those skilled in the art. The sway brace attachment of the present invention can not only withstand substantially heavy loads and support and/or suspend a variety of loads, but is also adaptable to a variety of flanged structures, is simply and expeditiously installable, is economical to manufacture and, hence, desirably inexpensive.

While the components and method of the present invention have been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the full range of equivalency to which each element thereof is entitled.

What is claimed is:

1. A sway brace attachment for clamping to a flange of a beam or other support structure, comprising:
   a body having a pair of spaced first and second side walls, with each of the first and second side walls having an elongate slot, wherein each of the slots has a closed end and an open end opening to one edge of a respective one of the first and second side walls, wherein each of the slots has a first portion and a second portion, the first portions of the first and second slots configured to receive the flange;
   an insert having a first end portion received in the second portion of the slot of the first side wall, and an opposite second end portion received in the second portion of the slot of the second side wall, the insert having at least one threaded hole sized and shaped to receive a threaded fastener.

2. The sway brace attachment of claim 1, further comprising at least one threaded fastener threaded in the at least one threaded hole, the at least one fastener configured to facilitate securement of the sway brace attachment to the flange when the flange is received in the first portions of the first and second slots.

3. The sway brace attachment of claim 2, wherein the at least one threaded fastener comprises at least one set screw extending through the at least one threaded hole of the insert to engage a first surface of the flange when the flange is received in the first portions of the first and second slots.

4. The sway brace attachment of claim 2, wherein the body has a top wall extending between the first and second side walls, the top wall has at least one top hole, wherein each of the at least one top hole is vertically aligned with one of the at least one threaded hole of the insert.

5. The sway brace attachment of claim 4, wherein the body has a bottom wall extending between the first and second walls and generally opposing the top wall.

6. The sway brace attachment of claim 5, wherein the bottom wall has a bottom threaded hole sized and shaped to receive a threaded fastener.

7. The sway brace attachment of claim 6, further comprising at least one threaded fastener threaded in the bottom threaded hole, the at least one fastener configured to facilitate securement of the sway brace attachment to the flange when the flange is received in the first portions of the first and second slots.

8. The sway brace attachment of claim 5, wherein the bottom wall includes first and second overlapping walls, wherein the first overlapping wall is connected to and extends from the first side wall and the second overlapping wall is connected to and extends from the second side wall.

9. The sway brace attachment of claim 8, wherein first and second overlapping walls have aligned bottom holes sized and shaped to receive a fastener.

10. The sway brace attachment of claim 9, wherein the bottom hole of the overlapping wall is threaded and configured to threadably receive a fastener.

11. The sway brace attachment of claim 1, wherein the first and second side walls each define a shoulder configured to support the insert in the second portions of the first and second slots.

12. The sway brace attachment of claim 11, wherein a portion of the closed end of each of the slots defined by the first portion is offset from a portion of the closed end defined by the second portion to define the shoulder of each of the first and second side walls.

* * * * *